(12) United States Patent
Ushigome et al.

(10) Patent No.: US 8,333,476 B2
(45) Date of Patent: Dec. 18, 2012

(54) IMAGE PROJECTION APPARATUS AND IMAGE DISPLAY SYSTEM

(75) Inventors: Reona Ushigome, Utsunomiya (JP); Kazuhiko Momoki, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 12/546,461

(22) Filed: Aug. 24, 2009

(65) Prior Publication Data
US 2010/0053559 A1 Mar. 4, 2010

(30) Foreign Application Priority Data
Aug. 26, 2008 (JP) .................................. 2008-216447

(51) Int. Cl.
*G03B 21/14* (2006.01)
(52) U.S. Cl. ................................. 353/20; 353/33; 353/81
(58) Field of Classification Search .................... 353/20, 353/30, 31, 33, 81
See application file for complete search history.

(56) References Cited

U.S. PATENT DOCUMENTS

| | | | |
|---|---|---|---|
| 7,040,760 B2 | 5/2006 | Nakanishi et al. | |
| 7,159,987 B2 * | 1/2007 | Sakata | 353/31 |
| 7,232,227 B2 * | 6/2007 | Yamasaki et al. | 353/94 |
| 7,270,427 B2 * | 9/2007 | Sakata | 353/94 |
| 7,411,722 B2 * | 8/2008 | Kowarz | 359/298 |
| 7,495,830 B2 * | 2/2009 | Maximus et al. | 359/489.08 |
| 7,710,669 B2 * | 5/2010 | Li | 359/834 |
| 2005/0134803 A1 * | 6/2005 | Tseng et al. | 353/20 |
| 2007/0002283 A1 * | 1/2007 | Shimada | 353/31 |
| 2007/0047061 A1 * | 3/2007 | Kowarz | 359/291 |
| 2007/0052928 A1 * | 3/2007 | Maeda et al. | 353/20 |
| 2007/0070304 A1 * | 3/2007 | Sakata | 353/94 |
| 2008/0088799 A1 * | 4/2008 | Kawamura | 353/20 |
| 2008/0094577 A1 * | 4/2008 | Krijn et al. | 353/20 |
| 2010/0053559 A1 * | 3/2010 | Ushigome et al. | 353/20 |

FOREIGN PATENT DOCUMENTS

| | | |
|---|---|---|
| JP | 2002-244211 | 8/2002 |
| JP | 2003-279899 A | 10/2003 |
| JP | 2004-206046 | 7/2004 |

\* cited by examiner

*Primary Examiner* — John Lee
(74) *Attorney, Agent, or Firm* — Canon U.S.A., Inc., IP Division

(57) ABSTRACT

An image projection apparatus includes light sources 111 to 113 emitting at least two colored lights whose wavelengths are different from each other, a polarization conversion element 2 controlling a polarization direction of the colored light, at least two light modulation elements 41 and 42 modulating incident light, a light guide optical system 31 guiding the at least two colored lights from the polarization conversion element to the at least two light modulation elements in accordance with the polarization direction, and a projection optical system 5. One of the at least two colored light and the other are emitted as lights whose polarization directions are different from each other from the polarization conversion element. A drive unit 6 turns on the light sources so that the one of the colored lights and at least one of the other enter the at least two light modulation elements at the same time.

5 Claims, 9 Drawing Sheets

| | | | |
|---|---|---|---|
| LED111(G) | ON | ON | ON |
| LED112(R) | ON | OFF | ON |
| LED113(B) | OFF | ON | OFF |
| LIQUID CRYSTAL PANEL 41 INCIDENT LIGHT | 111S (G-S POLARIZED LIGHT) | 111S (G-S POLARIZED LIGHT) | 111S (G-S POLARIZED LIGHT) |
| LIQUID CRYSTAL PANEL 42 INCIDENT LIGHT | 112P (R-P POLARIZED LIGHT) | 113P (B-P POLARIZED LIGHT) | 112P (R-P POLARIZED LIGHT) |

→ TIME

US 8,333,476 B2

IMAGE PROJECTION APPARATUS AND IMAGE DISPLAY SYSTEM

BACKGROUND OF THE INVENTION

1. Field of the Invention

The present invention relates to an image projection apparatus such as a liquid crystal projector which guides a plurality of colored lights to a plurality of light modulation elements via a polarization conversion element to project the plurality of colored lights from the plurality of light modulation elements.

2. Description of the Related Art

An image projection apparatus which uses a plurality of light sources emitting a plurality of colored lights and a polarization conversion element controlling polarization directions of the plurality of colored lights is disclosed in Japanese Patent Laid-Open Nos. 2002-244211 and 2004-206046.

An image projection apparatus disclosed in Japanese Patent Laid-Open No. 2002-244211, R-light, G-light, and B-light are emitted in sequence from light emitting diodes of R, G, and B (hereinafter, referred to as LEDs). All of the R-light, the G-light, and the B-light are converted into specific polarized lights (for example, S-polarized light) by a polarization conversion element constituted by a plurality of polarization conversion cells. The R-light, the G-light, and the B-light from the polarization conversion element enter one reflective light modulation element in sequence by one dichroic prism and one polarization beam splitter. A full-color image is projected by forming a primary image for each color on the reflective light modulation element in synchronization with turning on the LEDs of R, G, and B, in sequence.

In an image projection apparatus disclosed in Japanese Patent Laid-Open No. 2004-206046, the R-light, the G-light, and the B-light emitted from respective LEDs of R, G, and B in sequence are temporally alternately emitted as polarized lights having polarization directions orthogonal to each other (P-polarized light and S-polarized light) from a polarization conversion element including a plurality of polarization conversion cells. These polarized lights are alternately guided to two reflective light modulation elements for S-polarization and for P-polarization by using one dichroic prism and one polarization beam splitter. A full-color image is projected by forming a primary image in synchronization with S-polarized light and P-polarized light alternately entering the reflective light modulation elements.

However, in an image projection apparatus disclosed in Japanese Patent Laid-Open No. 2002-244211, in order to switch to turn on and off the LEDs of R, G, and B in sequence, compared with the case where all LEDs of R, G, and B are turned on, the brightness of a projected image is extremely reduced, or a color break is generated.

Also in an image projection apparatus disclosed in Japanese Patent Laid-Open No. 2004-206046, because S-polarized light and P-polarized light are alternately emitted from a polarization conversion element, the brightness of a projected image halves, and a color break is generated. Further, because each reflective light modulation element operates at intervals, these use efficiency is bad.

BRIEF SUMMARY OF THE INVENTION

The present invention provides an image projection apparatus which uses a light source emitting a plurality of colored lights and a polarization conversion element controlling polarization directions of the plurality of colored lights, which is configured to suppress the reduction of the brightness of a projected image or the generation of a color break.

An image projection apparatus as one aspect of the present invention includes a plurality of light sources configured to emit at least two colored lights whose wavelengths are different from each other, a polarization conversion element configured to control a polarization direction of each of the colored lights from the light sources, at least two light modulation elements, each of which is configured to modulate incident light, a light guide optical system configured to guide the at least two colored lights from the polarization conversion element to the at least two light modulation elements in accordance with the polarization direction, a projection optical system configured to project light from each of the light modulation elements onto a plane to be projected, and a drive unit configured to control the plurality of light sources. One of the at least two colored lights and the other light are emitted from the polarization conversion element as lights whose polarization directions are different from each other. The drive unit controls the plurality of light sources so that the one of the at least two colored lights and at least one of the other enter the at least two light modulation elements at the same time.

An image display system as another aspect of the present invention includes the image projection apparatus and an image supply apparatus configured to supply image information to the image projection apparatus.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Embodiment 1

FIGS. 1 to 4 show configurations of a liquid crystal projector (image projection apparatus) that is embodiment 1 of the present invention. In these drawings, an xyz-coordinate system is set in a three-dimensional space, and it is defined that light from an LED array light source (hereinafter, referred to simply as an array light source) 1 is propagated through an illumination optical system described later in a z-direction.

Figure 1:
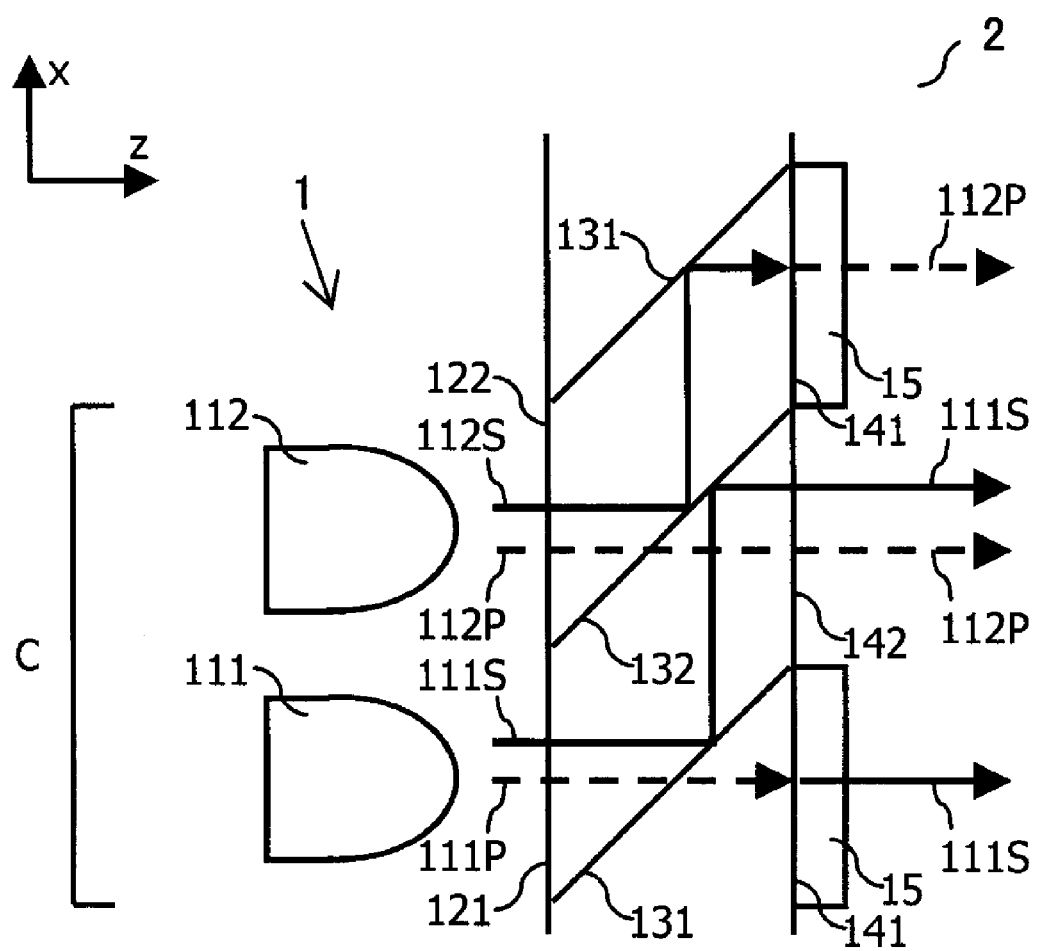
FIG. 1 is a view showing a configuration of a part of an array light source and a polarization conversion element which are used for a liquid crystal projector that is embodiment 1 of the present invention.
Figure 2:
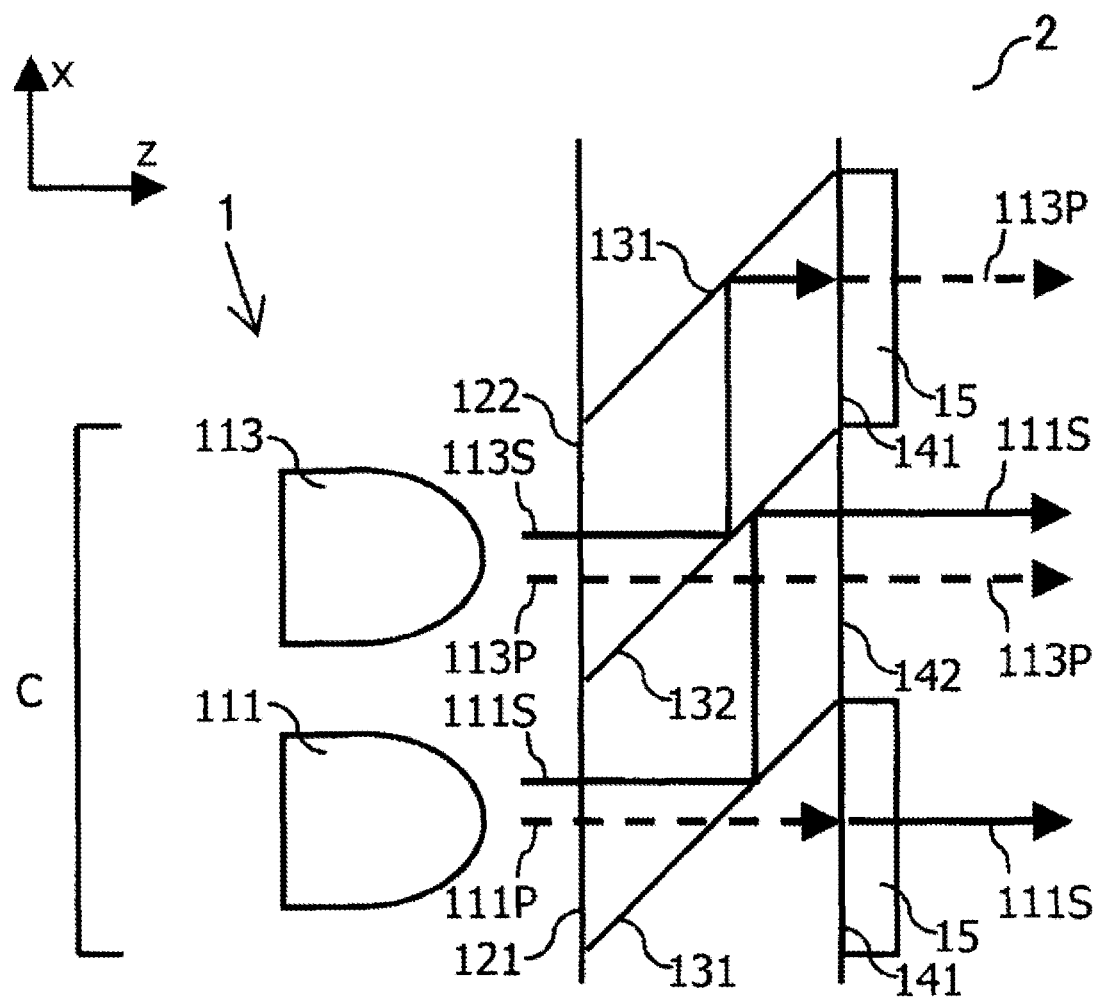
FIG. 2 is another view showing a configuration of a part of an array light source and a polarization conversion element in embodiment 1.
Figure 3:
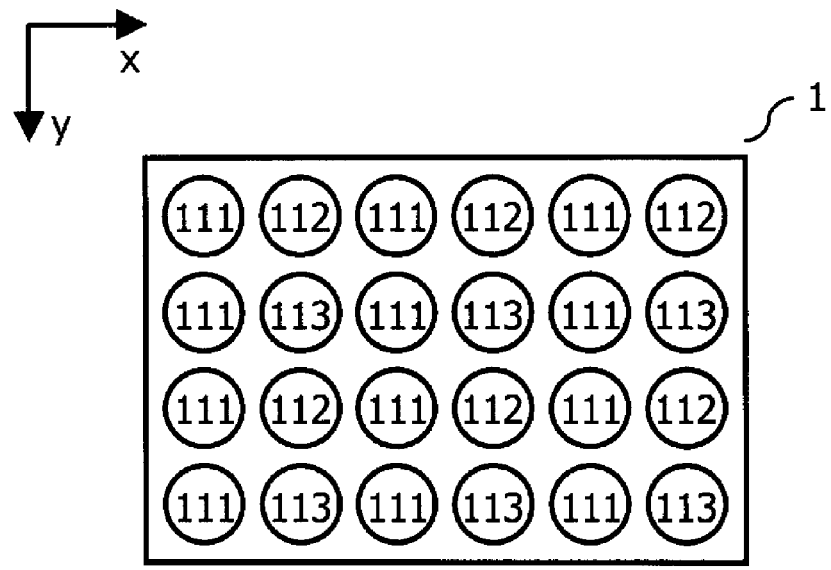
FIG. 3 is a view showing an arrangement of LEDs in an array light source in embodiment 1.
Figure 4:
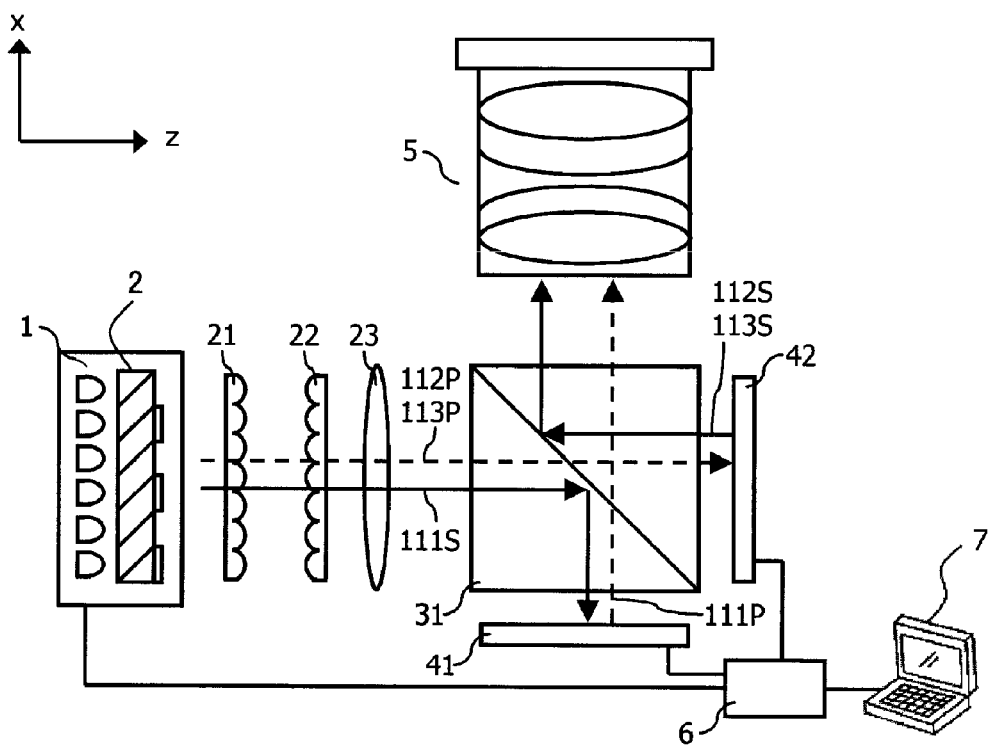
FIG. 4 is a view showing a configuration of a liquid crystal projector of embodiment 1.

FIGS. 1 and 2 show xz cross sections of parts of the array light source 1 and a polarization conversion element 2 in the liquid crystal projector at y-direction positions different from each other, respectively. FIG. 3 shows an arrangement of a plurality of LEDs when the array light source 1 is seen from a side opposite to the z-direction. Furthermore, FIG. 4 shows an xz cross section of an overall configuration of the liquid crystal projector.

First, referring to FIGS. 1 to 3, the configuration of the array light source 1 and the polarization conversion element 2 will be described. The array light source 1 and the polarization conversion element 2 constitute a polarization conversion optical system.

In FIGS. 1 to 3, reference numeral 111 denotes a G-LED (a first light source) which emits light with a green (G) wavelength band (a first colored light: hereinafter referred to as G-light). Reference numeral 112 denotes a R-LED (a second light source) which emits light with a red (R) wavelength band (a second colored light: hereinafter referred to as R-light). Reference numeral 113 denotes a B-LED (a third light source) which emits light with a blue (B) wavelength band (a third colored light: hereinafter referred to as B-light). The projector of the present embodiment includes a plurality of light sources (LEDs) which emit the three colored lights different in the wavelength bands from one another, respectively. In the embodiment, although the wavelength regions of the three colored lights are not preferably overlapped with one another (the regions where light intensities indicate at least half of the peak of the light intensity are not overlapped with one another), parts of the wavelength regions can be overlapped. Each LED emits non-polarized light. Although the present embodiment uses LEDs as light sources, it is not limited to this, and other light sources such as an organic electroluminescence element or a laser may also be used.

As shown in FIG. 3, in the array light source 1, a plurality of G-LEDs 111 are arranged in a y-direction (second direction) orthogonal to an x-direction (first direction) to constitute a G-LED array. Furthermore, a plurality of R-LEDs 112 and B-LEDs 113 are arranged in the y-direction to constitute an RB-LED array. These GLED array and RB-LED array are alternately arranged in the x-direction so as to be adjacent to each other. In the y-direction of the RB-LED array, the R-LED 112 and the B-LED 113 are alternately arranged.

As shown in FIGS. 1 and 2, the polarization conversion element 2 includes a plurality of polarization conversion cells C which are arrayed in the x-direction. The y-direction is a longitudinal direction of each of the polarization conversion cells C. An array period of the G-LED array and the RB-LED array in the x-direction in the array light source 1 is twice as long as an array period of the polarization conversion cells C in the same direction. Each polarization conversion cell C includes two first polarization splitting films (polarization splitting planes, or polarization splitting surfaces) 131, one second polarization splitting film (polarization splitting plane, or polarization splitting surface) 132 between them, and one phase plate 15. An array direction of the plurality of polarization conversion cells C, i.e. an array direction (x-direction) of the plurality of first and second polarization splitting films 131 and 132 corresponds to an alternately arranged direction of the G-LED array and the RB-LED array described above.

In an incident plane of each polarization conversion cell C, a region between a position of the first polarization splitting film 131 and a position of the second polarization splitting film 132 which is placed on the upper side is referred to as a first incident opening 121. In the incident plane, a region between a position of the second polarization splitting film 132 and a position of the first polarization splitting film 131 which is placed on the upper side is referred to as a second incident opening 122.

In the incident plane of each polarization conversion cell C, a region between a position of the first polarization splitting film 131 and a position of the second polarization splitting film 132 which is placed on the lower side is referred to as a first emission opening 141. In the incident plane, a region between a position of the second polarization splitting film 132 and a position of the first polarization splitting film 131 which is placed on the lower side is referred to as a second emission opening 142.

Each of the first polarization splitting film 131 and the second polarization splitting film 132 has a tilt of 45 degrees with respect to a light incident optical axis direction (z-direction). Each polarization splitting film has characteristics of a transmittance that is equal to or close to 100% (higher than 50%) for P-polarized light and that is equal to or close to 0% (lower than 50%) for S-polarized light. Each polarization splitting film is, actually, formed as a multi-layer film on a surface of a substrate made of glass or acrylic that is a parallel plate. The first and second polarization splitting films 131 and 132 split each of the G-light, the R-light, and the B-light that are three colored lights into two polarized lights (P-polarized light and S-polarized light) whose polarization directions are different from each other.

The phase plate 15 formed like a film is provided at the first emission opening 141 in the incident plane of each polarization conversion cell C. The phase plate 15 is a half-wavelength plate, and has a function that changes the polarization direction of an incident linearly polarized light (rotates by 90 degrees).

An optical action of the polarization conversion element 1 will be described. P-polarized light 111P and S-polarized light 111S contained in green colored light (hereinafter, referred to as G-light) emitted from the G-LED 111 as non-polarized light enter each polarization conversion cell C from the first incident opening 121. P-polarized light 112P and S-polarized light 112S contained in red colored light (hereinafter, referred to as R-light) emitted from the R-LED 112 as non-polarized light enter each polarization conversion cell C from the second incident opening 122. Furthermore, P-polarized light 113P and S-polarized light 113S contained in blue colored light (hereinafter, referred to as B-light) emitted from the B-LED 113 as non-polarized light also enter each polarization conversion cell C from the second incident opening 122.

An optical member (not shown) which converts a divergent light beam emitted from each LED into a parallel light beam or a convergent light beam which converges on each polarization splitting film is preferably provided between the array light source 1 and the polarization conversion element 2.

The P-polarized light 111P in the G-light entered each polarization conversion cell C from the first incident opening 121 transmits through the first polarization splitting film 131 and is converted into the S-polarized light 111S by the phase plate 15 provided at the first emission opening 141 to be emitted. The S-polarized light 111S in the G-light entered each polarization conversion cell C from the first incident opening 121 is reflected on the first polarization splitting film 131 and further is reflected on the second polarization splitting film 132 to be emitted from the second emission opening 142 remaining as the S-polarized light 111S. Thus, all of the G-lights from the G-LEDs 111 are converted into the S-polarized lights to be emitted from the polarization conversion element 2. Hereinafter, the S-polarized light of the G-light is referred to as G-S polarized light.

The P-polarized light 112P in the R-light entered each polarization conversion cell C from the second incident opening 122 transmits through the second polarization splitting film 132 and is emitted from the second emission opening 142 remaining as the P-polarized light 112P. The S-polarized light 112S in the R-light entered each polarization conversion cell C from the second incident opening 122 is reflected on the second polarization splitting film 132 and further is reflected on the first polarization splitting film 131 to be converted into the P-polarized light 112P by the phase plate 15 provided at the first emission opening 142 to be emitted. Thus, all of the R-lights from the R-LEDs 112 are converted into the P-polarized lights to be emitted from the polarization conversion element 2. Hereinafter, the P-polarized light of the R-light is referred to as R-P polarized light.

The P-polarized light 113P in the B-light entered each polarization conversion cell C from the second incident opening 122 transmits through the second polarization splitting film 132 and is emitted from the second emission opening 142 remaining as the P-polarized light 113P. The S-polarized light 113S in the B-light entered each polarization conversion cell C from the second incident opening 122 is reflected on the second polarization splitting film 132 and further is reflected on the first polarization splitting film 131 to be converted into the P-polarized light 113P by the phase plate 15 provided at the first emission opening 142 to be emitted. Thus, all of the B-lights from the B-LEDs 113 are converted into the P-polarized lights to be emitted from the polarization conversion element 2. Hereinafter, the P-polarized light of the B-light is referred to as B-P polarized light.

In FIG. 4, as described above, each of the G-S polarized light 111S, the R-P polarized light 112P, and the B-P polarized light 113P is emitted as a light beam from the polarization conversion element 1. Each light beam is split into a plurality of light beams by a first fly-eye lens 21, and each split light beam is condensed near a second fly-eye lens 22 to form a light source image (two-dimensional light source image). Each of the first and the second fly-eye lenses 21 and 22 is constituted by a plurality of lens cells arranged in two-dimensional directions. Each lens cell has a rectangular lens shape similar to a liquid crystal panel described later (a light modulation element or an image forming element) that is a plane to be illuminated.

A plurality of split light beams as G-S polarized lights 111S transmitted through the second fly-eye lens 22 are condensed by a condenser lens 23 to be superimposed on a G-reflective liquid crystal panel 41 via a polarization beam splitter 31. Thus, the G-reflective liquid crystal panel 41 is uniformly illuminated by the G-S polarized light 111S. The polarization beam splitter 31 constitutes a light guide optical system which guides the incident light into the two reflective liquid crystal panels 41 and 42 in accordance with its polarization direction or a color separating and combining optical system. The G-reflective liquid crystal panel (hereinafter, referred to as a G-panel) 41 corresponds to a first light modulation element.

A plurality of split light beams as R-P polarized light 112P and B-P polarized light 113P transmitted through the second fly-eye lens 22 are condensed by the condenser lens 23 to be superimposed on an RB-reflective liquid crystal panel 42 via the polarization beam splitter 31. Thus, the RB-reflective liquid crystal panel 42 is uniformly illuminated by the R-P polarized light 112P and the B-P polarized light 113P. Because the R-LED 112 and the B-LED 113 are alternately turned on (are controlled so as to alternately turned on) as described later, the R-P polarized light 112P and the B-P polarized light 113P alternately illuminate the RB-reflective liquid crystal panel 42. The RB-reflective liquid crystal panel (hereinafter, referred to as an RB panel) 42 corresponds to a second light modulation element.

The elements provided from the array light source 1 up to at least the condenser lens 23 are referred to as an illumination optical system. This is the same for other embodiments described later.

The polarization beam splitter 31 has a polarization splitting film (polarization splitting plane) inside it. The polarization splitting film has a tilt of 45 degrees with respect to an incident optical axis direction (z-direction). The polarization splitting film has characteristics of a transmittance that is equal to or close to 100% (higher than 50%) for the P-polarized light and that is equal to or close to 0% (lower than 50%) for the S-polarized light. This polarization splitting film is formed as a multi-layer film.

The G-S polarized light 111S from the condenser lens 23 is reflected on the polarization splitting film of the polarization beam splitter 31 to enter the G-panel 41.

In the embodiment, each reflective liquid crystal panel is connected to a drive circuit (drive unit) 6. The drive circuit 6 that is parts of the projector inputs image information (image signal) from an image supply apparatus 7 such as a personal computer, a DVD player, a video cassette recorder, or a TV tuner. The projector and the image supply apparatus 7 constitute an image display system.

The drive circuit 6 drives each of the reflective liquid crystal panels corresponding to respective colors, based on an R-, G-, and B-components of the inputted image signal. Thus, an original image for green (G) is formed on the G-panel 41, and original images for red (R) and blue (B) are alternately formed on the RB-panel 42. Each reflective liquid crystal panel reflects incident light and modulates and reflects it and emits it as image light. Furthermore, the drive circuit 6 also controls each LED in the array light source 1 so that two colored lights enter two panels among the three reflective liquid crystal panels at the same time (at substantially the same time). In other words, the drive circuit (drive unit) controls turning on and off (the timing of turning on and off) of each LED (each light source, or a light source for each color). Such a configuration is the same for other embodiments described later although it is not shown in the drawings.

The P-polarized light (G-P polarized light) 111P that is G-image light from the G-panel 41 is transmitted through the polarization beam splitter 31 to be projected on a plane to be projected such as a screen (not shown) by a projection lens (projection optical system) 5.

On the other hand, the R-P polarized light 112P and the B-P polarized light 113P transmitted through the condenser lens 23 transmit through the polarization beam splitter 31 to enter the RB-panel 42.

The S-polarized lights (R-S polarized light and B-S polarized light) 112S and 113S that are R- and B-image lights from the RB-panel 42 are reflected on the polarization splitting film of the polarization beam splitter 31 to be projected on the plane to be projected by the projection lens 5.

Thus, in the present embodiment, one colored light (G-light) and two colored lights (R-light and B-light) among the three colored lights are emitted from the polarization conversion element 2 as lights having polarization directions different from each other. As described below, the plurality of LEDs 111 to 113 are turned on so that the one colored light and at least one of the two colored lights enter the two panels 41 and 42 at the same time.

Figures 5, 6:
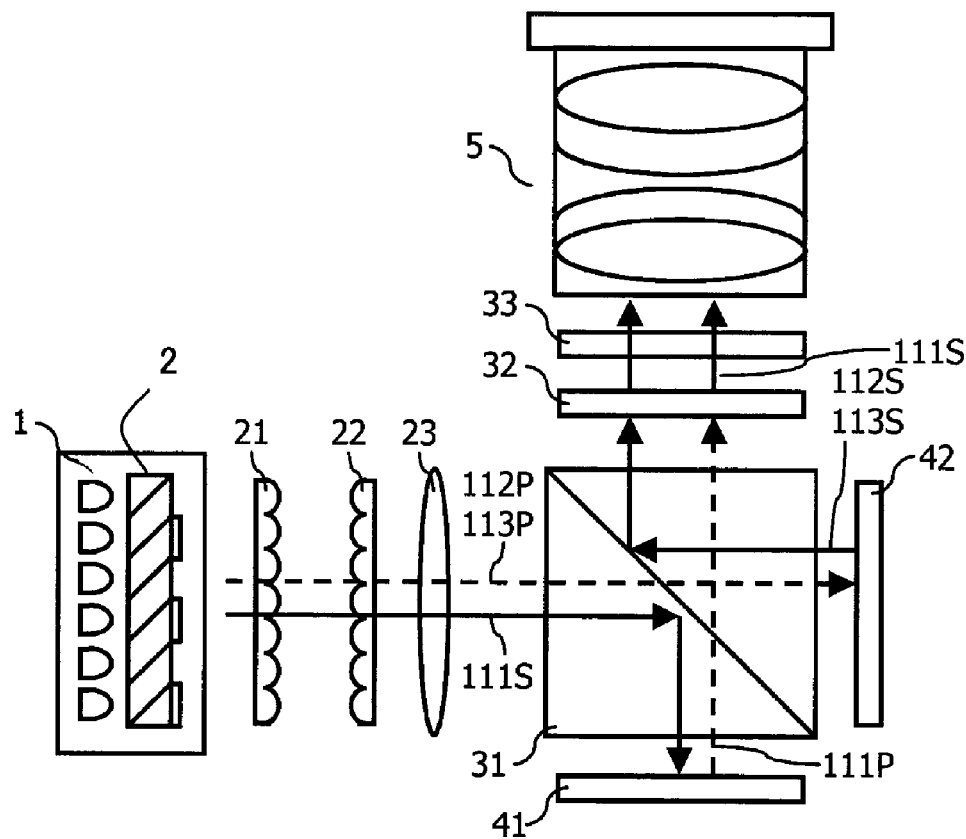
FIG. 5 is a view of a control time chart of LEDs and a liquid crystal panel in embodiment 1.
FIG. 6 is a view showing another example of a liquid crystal projector of embodiment 1.

Referring to FIG. 5, a lighting control of the LEDs 111 to 113 and a driving control of the G-panel 41 and the RB-panel 42 in the present embodiment will be described. FIG. 5 shows a time chart of these controls. In FIG. 5, "On" of "LED" indicates that the LED is turned on, and "Off" indicates that the LED is turned off. The "liquid crystal panel incident light" indicates light that enters one of the G-panel 41 and the RB-panel 42 and its polarization direction.

The G-LED 111 is always turned on, and the G-S polarization light 111S always enters the G-panel 41. Therefore, the original image for green (G) is always formed on the G-panel 41. On the other hand, the R-LED 112 and the B-LED 113 are temporally alternately turned on, and the R-P polarized light 112P and the B-P polarized light 113P are alternately formed on the RB-panel 42. Therefore, the original images for red (R) and blue (B) are alternately formed on the RB-panel 42 in synchronization with the alternate entrance of the R-P polarized light 112P and the B-P polarized light 113P. Thus, a projection image as an RGB color image is displayed on the plane to be projected.

When obtaining white color, the influence of the G-light for the brightness is large because the G-light always occupy around 60 to 80%. In the present embodiment, the G-LED 111 is always turned on so that the G-light always enters the G-panel 41 to be projected on the plane to be projected. Therefore, the G-light and one of the R-light and B-light enter the two panels 41 and 42 at the same time to be projected on the plane to be projected. According to the present embodiment, compared with the cases where the R-LED, the G-LED, and the B-LED are turned on in sequence, the brightness of the projection image can be improved (the reduction of the brightness can be suppressed). Although a color break is generated when the R-LED, the G-LED, and the B-LED are turned on in sequence, in the present embodiment, the generation of the color break can be suppressed because the G-LED 111 is always turned on.

FIG. 6 shows another example of a projector in the present embodiment. In the projector shown in FIG. 4, since the light detecting performance for leak light is low, the leak light is projected onto the plane to be projected when displaying black color, and the contrast may be reduced. On the other hand, in the projector shown in FIG. 6, a wavelength-selective phase plate 32 which rotates only a polarization direction of the G-light by 90 degrees and a polarizer 33 which shields only light in a specific polarization direction are provided between the polarization beam splitter 31 and the projection lens 5. Other configurations and the control of the LED and the liquid crystal panel are similar to those shown in FIGS. 4 and 5.

When displaying white color, G-P polarized light 111P as G-image light transmitted through the polarization beam splitter 31 is converted into G-S polarized light 111S by the wavelength-selective phase plate 32 to transmit through the polarizer 33. R-S polarized light 112S and B-S polarized light 113S as R- and B-image lights, respectively, transmit through the wavelength-selective phase plate 32 as they are to transmit through the polarizer 33.

When displaying black color, light having the same polarization direction as that of incident light is emitted from each panel. Therefore, in the polarization beam splitter 31, the G-S polarized light from the G-panel 41 is reflected and the R-P polarized light and the B-P polarized light from the RB-panel 42 transmit before returning to the array light source 1.

However, leak light is generated in the polarization beam splitter 31. Since G-leak light emitted from the polarization beam splitter 31 is S-polarized light, it is converted into P-polarized light by the wavelength-selective phase plate 32 to be shielded by the polarizer 33. Since R- and B-leak lights emitted from the polarization beam splitter 31 are P-polarized lights, they transmit through the wavelength-selective phase plate 32 remaining as P-polarized lights to be shielded by the polarizer 33. Thus, because the leak lights generated by the polarization beam splitter 31 can be shielded by the polarizer 33, the contrast of the projected image can be improved.

In FIG. 3, the case where the G-LED array and the RB-LED array are alternately arranged in an x-direction is shown, but these do not have to be alternately arranged and LEDs as many as necessary have only to be arranged. This is the same for other embodiments described later.

In the present embodiment, although the case where the G-LED is always turned on and the R-LED and the B-LED are alternately turned on has been described, the G-LED can be replaced with the R-LED and the B-LED. Also in this case, an effect of suppressing a reduction of the brightness of the projected image and an effect of suppressing a generation of the color break can be obtained to some extent. This is the same for other embodiments described later.

In the present embodiment, the case where a plurality of LEDs are used as a light source has been described, but another light emitting element such as a laser diode or an organic electroluminescence element can also be used. This is the same for other embodiments described later.

In the present embodiment, the case where the phase plate 15 is provided at the first emission opening 141 in the polarization conversion element 1 has been described, but it may also be provided at the second emission opening 142. In this case, polarization directions emitted from the polarization conversion element are reversed between the G-light and the R- and B-lights. This is the same for other embodiments described later.

As a polarization beam splitter, a configuration in which a multi-layer film is disposed inside a prism is well known, but a polarization beam splitter utilizing a structural birefringence can also be used. Because the polarization beam splitter utilizing the structural birefringence has an incident angle range that is wider than that of a polarization beam splitter using a multi-layer film, leak light is low and it is effective for improving the contrast of the projected image.

In the present embodiment, reference numeral 111 denotes a light source which emits G-light, reference numeral 112 denotes a light source which emits R-light, and reference numeral 113 denotes a light source which emits B-light, but the present invention is not limited to this. For example, reference numeral 111 can be a light source which emits G-light and both reference numerals 112 and 113 can be light sources which emit B-light or R-light. In this case, since there are only two colored light among three primary color of light, a full-color image can not be displayed. However, if the configuration where the R-light and the B-light are alternately emitted from the light sources 112 and 113 with a period of equal to or shorter than 1/60 second (preferably, equal to or shorter than 1/120 second) is applicable, a (pseudo) full-color image can be displayed due to an afterimage effect given to a human vision. In other words, the present invention can also be applied to an image projection apparatus in which two colored lights are emitted from a plurality of light sources to be guided to two light modulation elements.

Embodiment 2

Figure 7:
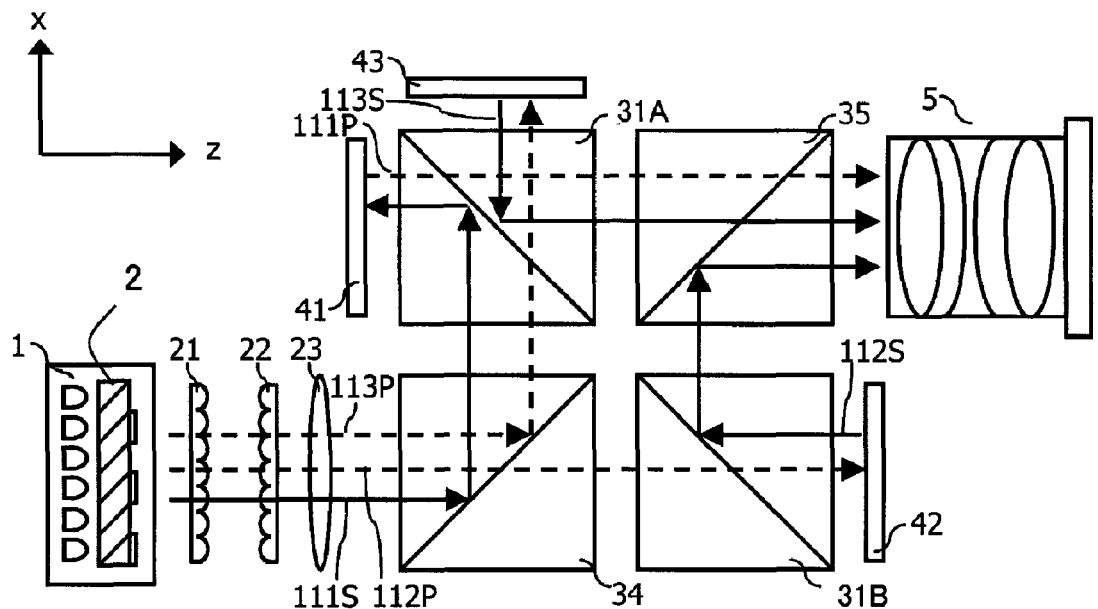
FIG. 7 is a view showing a configuration a liquid crystal projector that is embodiment 2 of the present invention.

FIG. 7 shows a configuration of a liquid crystal projector that is embodiment 2 of the present invention. The configurations of the array light source 1 and the polarization conversion element 2 are the same as those of FIG. 1. Therefore, G-S polarized light, R-P polarized light, and B-P polarized light are emitted from the polarization conversion element 2. The configuration of the illumination optical system up to the condenser lens 23 also the same as that of embodiment 1.

The G-S polarized light 111S transmitted through the condenser lens 23 enters a dichroic prism 34.

Figures 8A, 8B:
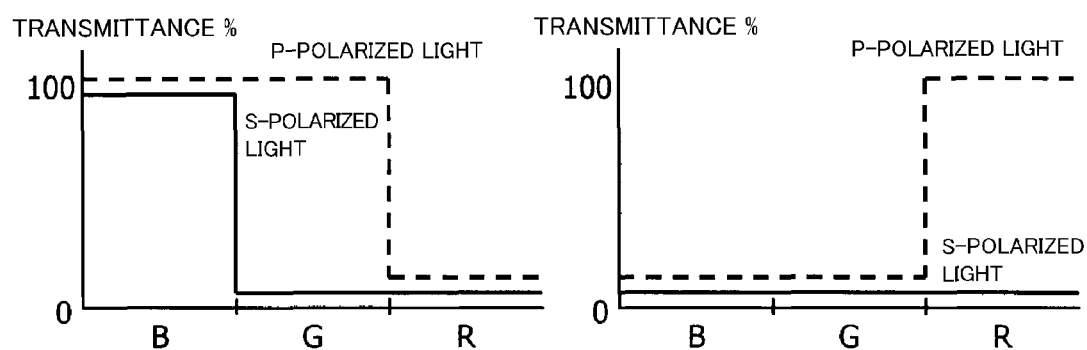
FIGS. 8A and 8B are views showing optical characteristics of a dichroic prism in embodiment 2.

The dichroic prism 34 has a polarization splitting film (a polarization splitting plane) inside it, and has a tilt of 45 degrees with respect to an incident optical axis direction (z-direction). The polarization splitting film of the dichroic prism 34, as shown in FIG. 8A, has characteristics of a transmittance for P-polarized light that is equal to or close to 100% (higher than 50%) in B- and G-bands and that is equal to or close to 0% (lower than 50%) in an R-band. Furthermore, the polarization splitting film has characteristics of a transmittance for S-polarized light that is equal to or close to 100% (higher than 50%) in a B-band and that is equal to or close to 0% (lower than 50%) in G- and R-bands. The polarization splitting film is formed inside the prism as a multi-layer film.

The G-S polarized light 111S transmitted through the condenser lens 23 is reflected on the polarization splitting film of the dichroic prism 34, and is reflected on a polarization beam splitter 31A which has the same characteristics as those of the polarization beam splitter 31 of embodiment 1 to enter the G-panel (first light modulation element) 41.

G-P polarized light 111*p* that is G-image light from the G-panel 41 transmits through the polarization beam splitter 31A to enter a dichroic prism 35.

The dichroic prism 35 has a polarization splitting film (polarization splitting plane) inside it and has a tilt of 45 degrees with respect to an incident optical axis direction (z-direction or x-direction). The polarization splitting film of the dichroic prism 35, as shown in FIG. 8B, has characteristics of a transmittance for P-polarized light that is equal to or close to 0% (lower than 50%) in B- and G-bands and that is equal to or close to 100% (higher than 50%) in an R-band. Furthermore, the polarization splitting film has characteristics of a transmittance for S-polarized light that is equal to or close to 0% in B-, G-, and R-bands. This polarization splitting film is formed inside the prism as a multi-layer film.

G-P polarized light 111P entered the dichroic prism 35 as G-image light transmits through the dichroic prism 35 to be projected onto a plane to be projected such as a screen (not shown) by a projection lens 5.

On the other hand, R-P polarized light 112P transmitted through the condenser lens 23 transmits through the dichroic prism 34 and transmits through a polarization beam splitter 31B having the same characteristics as those of the polarization beam splitter 31 of embodiment 1 to enter an R-panel (second light modulation element) 42. R-S polarized light 112S that is an R-image light from the R-panel 42 is reflected on the polarization beam splitter 31B and is reflected on the dichroic prism 35 to be projected onto the plane to be projected by the projection lens 5.

B-P polarized light 113P transmitted through the condenser lens 23 is reflected on the dichroic prism 34 and transmits through the polarization beam splitter 31A to enter a B-panel (third light modulation element) 43. B-S polarized light 113S that is a B-image light from the B-panel 43 is reflected on the polarization beam splitter 31A and transmits through the dichroic prism 35 to be projected onto the plane to be projected by the projection lens 5.

Thus, in the projector of the present embodiment, three liquid panels 41 to 43 corresponding to one of R, G, and B are used. When the G-light (one colored light) among three colored lights enters the G-panel 41, at the same time, the G-, R-, and B-LEDs 111 to 113 are turned on so that the R-light and the-B light (two colored lights) enter the R- and B-panels 42 and 43, respectively. Thus, the projected image as an RGB color image is displayed.

In embodiment 1 described above, due to the use of only two liquid panels, it is necessary to alternately turn on the R-LED and the B-LED and to control the RB-panel in synchronization with it. On the other hand, in the present embodiment, because all of R-, G-, and B-LEDs can be turned on at the same time, the projected image can be brighter. Furthermore, the color break is not generated.

The light guide optical system (color separating and combining optical system) constituted by the dichroic prisms 34 and 35 and the polarization beam splitters 31A and 31B, as shown in FIG. 7, is simply an example, and a light guide optical system that has another configuration may also be used.

As described in another example of embodiment 1, the wavelength-selective phase plate and the polarizer can reduce the leak light at the polarization beam splitters 31A and 31B, and the contrast of the projected image can be improved. This is the same for other embodiments.

Embodiment 3

Figure 10A:
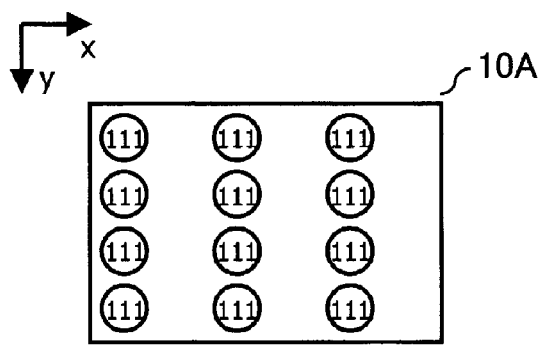
FIGS. 10A and 10B are views showing an arrangement of LEDs in two array light sources in embodiment 3.
Figure 10B:
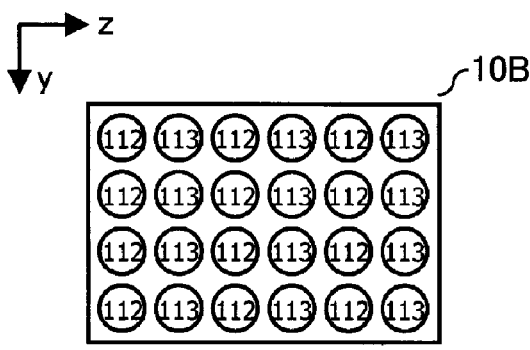
Figure 11:
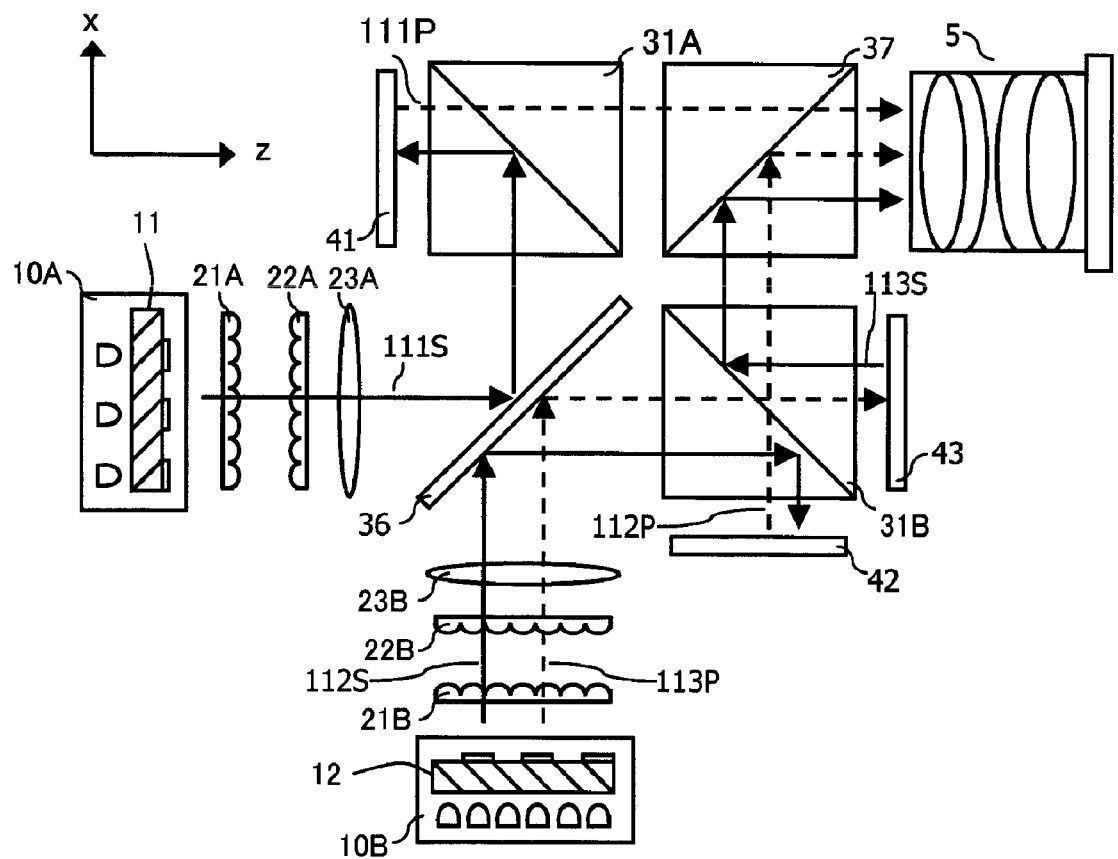
FIG. 11 is a view showing a configuration of a liquid crystal projector of embodiment 3.

FIGS. 9 to 11 show configurations of a liquid crystal projector that is embodiment 3 of the present invention. In these drawings, an xyz-coordinate system is set in the three-dimensional space, and it is defined that lights from LED array light sources (hereinafter, referred to simply as array light sources) 10A and 10B are propagated in an illumination optical system described later in a z-direction and an x-direction, respectively.

Figure 9A:
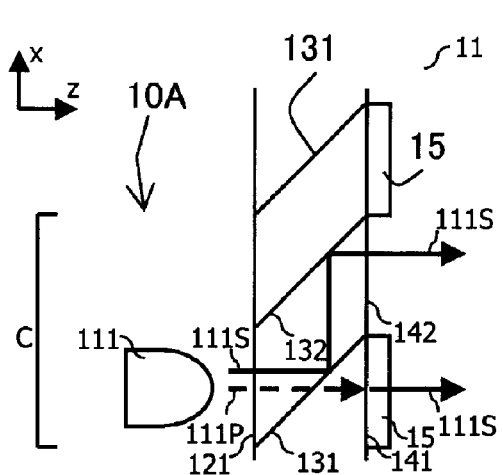
FIGS. 9A and 9B are views showing a configuration of a part of two array light sources and two polarization conversion elements which are used for a liquid crystal projector that is embodiment 3 of the present invention.
Figure 9B:
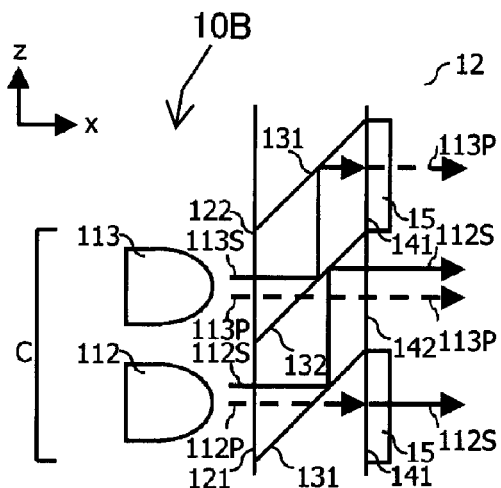

FIGS. 9A and 9B show xz cross sections of parts of the array light sources 10A and 10B and the polarization conversion elements 11 and 12 in the liquid crystal projector, respectively. FIGS. 10A and 10B show arrangements of a plurality of LEDs when the array light sources 10A and 10B are seen from sides opposite to the z-direction and the x-direction, respectively. Further, FIG. 11 shows an xz cross section of an overall configuration of the liquid crystal projector.

In FIGS. 9 and 10, reference numeral 111 denotes a G-LED which emits light having a green (G) band (first colored light: hereinafter, referred to as G-light) that is a first wavelength band. Reference numeral 112 denotes an R-LED which emits light having a red (R) band (second colored light: hereinafter, referred to as an R-light) that is a second wavelength band different from the first wavelength band. Reference numeral 113 denotes a B-LED which emits light having a blue (B) band (third colored light: hereinafter, referred to as a B-light) that is a third wavelength band different from the first and second wavelength bands. Thus, the projector of the present embodiment includes a plurality of light sources (LEDs) which emit corresponding one of the three colored lights differing in wavelength bands from one another. Each LED emits non-polarized light.

As shown in FIG. 1A, the array light source 10A includes a G-LED array where a plurality of G-LEDs 111 are arranged in a second direction (y-direction) orthogonal to a first direction (x-direction). The G-LED array is arranged every other array in the first direction.

As shown in FIG. 10B, the array light source 10B includes an R-LED array where a plurality of R-LEDs 112 are arranged in the second direction (y-direction) orthogonal to the first direction (z-direction) and a B-LED array where a plurality of B-LEDs 113 are arranged in the same direction. These R-LED array and B-LED array are alternately arranged adjacent to each other in the z-direction.

In FIG. 9A, a polarization conversion element 11 has a plurality of polarization conversion cells C which are arrayed in an x-direction. A y-direction is a longitudinal direction of each polarization conversion cell C. An arrangement period of the G-LED arrays of the array light source 10A in the x-direction is equal to that of the polarization conversion cells C in the same direction. Each polarization conversion cell C includes two first polarization splitting films (polarization splitting planes) 131, one second polarization splitting film (polarization splitting plane) 132 arranged between them, and one phase plate 15. An arrangement direction of the plurality of polarization conversion cells C, i.e. an arrangement direction (x-direction) of the plurality of first and second polarization splitting films 131 and 132 corresponds to the arrangement direction of the G-LED arrays.

In FIG. 9B, a polarization conversion element 12 has a plurality of polarization conversion cells C which are arrayed in a z-direction. A y-direction is a longitudinal direction of each polarization conversion cell C. An arrangement period of the R-LED arrays and the B-LED arrays of the array light source 10B in the z-direction is twice as large as that of the polarization conversion cells in the same direction. Each polarization conversion cell C includes two first polarization splitting films (polarization splitting planes) 131, one second polarization splitting film (polarization splitting plane) 132 arranged between them, and one phase plate 15. An arrangement direction of the plurality of polarization conversion cells C, i.e. an arrangement direction (z-direction) of the plurality of first and second polarization splitting film 131 and 132 corresponds to an alternate arrangement direction of the R-LED arrays and the B-LED arrays.

In both polarization conversion elements 11 and 12, a region from a position of the first polarization splitting film 131 up to a position of the second polarization splitting film 132 at the upper side in an incident plane of each polarization conversion cell C is referred to as a first incident opening 121. In the polarization conversion element 12, a region from the second polarization splitting film 132 up to the first polarization splitting film 131 at the upper side in an incident plane of each polarization conversion cell C is referred to as a second incident opening 122.

In both polarization conversion elements 11 and 12, a region from a position of the first polarization splitting film 131 up to a position of the second polarization splitting film 132 at the bottom side in an incident plane of each polarization conversion cell C is referred to as a first emission opening 141. In the polarization conversion element 12, a region from a position of the second polarization splitting film 132 up to a position of the first polarization splitting film 131 at the bottom side in an incident plane of each polarization conversion cell C is referred to as a second emission opening 142.

Each of the first polarization splitting film 131 and the second polarization splitting film 132 has a tilt of 45 degrees with respect to an incident optical axis direction of light (z-direction for the polarization conversion element 11, and x-direction for the polarization conversion element 12) Each polarization splitting film has characteristics of a transmittance that is equal to or close to 100% (higher than 50%) for P-polarized light and that is equal to or close to 0% (lower than 50%) for S-polarized light. Each polarization splitting film is actually formed on a surface of a substrate made of glass or acrylic that is a parallel plate as a multi-layer film. The first and the second polarization splitting films 131 and 132 split each of the G-light, R-light, and B-light which are three colored lights into two polarized lights which have polarization directions different from each other (P-polarized light and S-polarized light).

The phase plate 15 formed like a film shape is provided at the first emission opening 141 in an emission plane of each polarization conversion cell C. The phase plate 15 is a ½ wavelength plate, and has a function that changes (rotates by 90 degrees) a polarization direction of an incident linearly polarized light.

An optical action of the polarization conversion element 11 will be described. P-polarized light 111P and S-polarized light 111S contained in G-light emitted as non-polarized light from the G-LED 111 of the array light source 10A enter each polarization conversion cell C from the first incident opening 121. An optical member (not shown) which converts a divergent light beam emitted from each G-LED into a parallel light beam or a convergent light beam which converges on each polarization splitting film is preferably provided between the array light source 10A and the polarization conversion element 11.

The P-polarized light 111P in the G-lights entered each polarization conversion cell C from the first incident opening 121 transmits through the first polarization splitting film 131 and is converted into the S-polarized light 111S by the phase plate 15 provided at the first emission opening 141 to be emitted. The S-polarized light 111S in the G-lights entered each polarization conversion cell C from the first incident opening 121 is reflected on the first polarization splitting film 131 and is further reflected on the second polarization splitting film 132 to be emitted remaining as S-polarized light 111S from the second emission opening 142. Therefore, all of the G-lights emitted from the G-LEDs 111 are converted into S-polarized lights (hereinafter, referred to as G-S polarized lights) to be emitted from the polarization conversion element 11.

Next, an optical action of the polarization conversion element 12 will be described. P-polarized light 112P and S-polarized light 112S which are contained in R-lights emitted as non-polarized lights from the R-LEDs 112 of the array light source 10B enter each polarization conversion cell C from the first incident opening 121. Further, P-polarized light 113P and S-polarized light 113S which are contained in B-lights emitted as non-polarized light from the B-LEDs 113 of the array light source 10B also enter each polarization conversion cell C from the second incident opening 122.

An optical member (not shown) which converts divergent light beams emitted from each R-LED and each B-LED into parallel light beams or convergent light beams which converge on each polarization splitting film is preferably provided between the array light source 10B and the polarization conversion element 12.

The P-polarized light 112P in the R-lights entered each polarization conversion cell C from the first incident opening 121 transmits through the first polarization splitting film 131 and is converted into the S-polarized light 112S by the phase plate 15 provided at the first emission opening 141 to be emitted. The S-polarized light 112S in the R-lights entered each polarization conversion cell C from the first incident opening 121 is reflected on the first polarization splitting film 131 and is further reflected on the second polarization splitting film 132 to be emitted remaining as S-polarized light 112S from the second emission opening 142. Thus, all of the R-lights emitted from the R-LEDs 112 are converted into S-polarized lights (hereinafter, referred to as R-S polarized lights) to be emitted from the polarization conversion element 12.

The P-polarized light 113P in the B-lights entered each polarization conversion cell C from the second incident opening 122 transmits through the second polarization splitting film 132 and is emitted remaining as P-polarized light 113P from the second emission opening 142. The S-polarized light 113S in the B-lights entered each polarization conversion cell C from the second incident opening 122 is reflected on the second polarization splitting film 132 and is further reflected on the first polarization splitting film 131 to be converted into the P-polarized light 113P by the phase plate 15 provided at the first emission opening 141 to be emitted. Thus, all of the B-lights emitted from the B-LEDs 113 are converted into P-polarized lights (hereinafter, referred to as B-P polarized lights) to be emitted from the polarization conversion element 12.

In FIG. 11, as described above, each of the G-S polarized light 111S, the R-S polarized light 112S, and the B-P polarized light 113P is emitted as a light beam from one of the polarization conversion elements 11 and 12. Each light beam is split into a plurality of light beams by a first fly-eye lens 21A or 21B, and each split light beam is condensed near a second fly-eye lens 22A or 22B to form a light source image (two-dimensional light beam image). Each of the first and second fly-eye lenses 21A, 21B, 22A, and 22B is constituted by a plurality of lens cells arranged in two-dimensional directions. Each lens cell has a rectangular lens shape that is a shape similar to the G-, R-, or B-panel (light modulation element or image forming element) that is a reflective liquid crystal panel described later or a plane to be projected.

A plurality of split light beams as G-S polarized light 111S transmitted through the second fly-eye lens 22A are condensed by a condenser lens 23A. Subsequently, it is reflected on a reflection mirror 36 and a polarization beam splitter 31A which has the same characteristics as those of the polarization beam splitter 31 of embodiment 1 to be superimposed on the G-panel 41. Thus, the G-panel 41 is uniformly illuminated by the G-S polarized light 111S. The G-panel 41 corresponds to a first light modulation element.

Each of a plurality of split light beams as R-S polarized light 112S and B-P polarized light 113P transmitted through the second fly-eye lens 22B is condensed by a condenser lens 23B. Subsequently, it is reflected on the reflection mirror 36, and is reflected on or transmits through a polarization beam splitter 31B which has the same characteristics as those of the polarization beam splitter 31 of embodiment 1 to be superimposed on the R-panel 42 and the B-panel 43. Thus, the R-panel 42 and the B-panel 43 are uniformly illuminated by the R-S polarized light 112S and the B-P polarized light 113P, respectively. The R-panel 42 and the B-panel 43 correspond to a second light modulation element and a third light modulation element, respectively.

The G-P polarized light 111P that is G-image light from the G-panel 41 transmits through the polarization beam splitter 31A to enter a dichroic prism 37.

Figure 12:
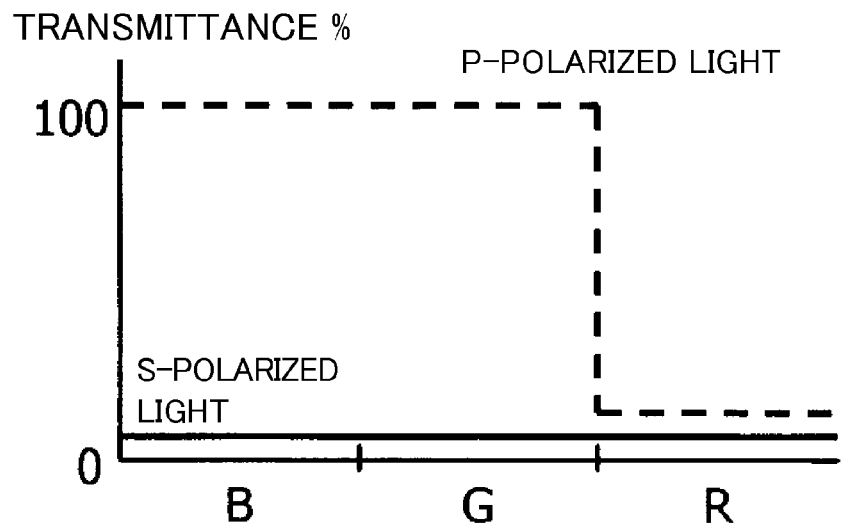
FIG. 12 is a view showing optical characteristics of a dichroic prism in embodiment 3.

The dichroic prism 37 has a polarization splitting film inside it and has a tilt of 45 degrees with respect to an incident optical axis direction (z-direction and x-direction). The polarization splitting film of the dichroic prism 37, as shown in FIG. 12, has characteristics of transmittance for P-polarized light that is equal to or close to 100% (higher than 50%) in the B- and G-bands and that is equal to or close to 0% (lower than 50%) in the R-band. Furthermore, the polarization splitting film has characteristics of transmittance for S-polarized light that is equal to or close to 0% (lower than 50%) in the B-, G-, and R-bands. This polarization splitting film is formed as a multi-layer film inside the prism.

The G-P polarized light 111P entered the dichroic prism 37 transmits through the dichroic prism 37 to be projected on a plane to be projected such as a screen (not shown) by the projection lens 5.

R-P polarized light 112P that is R-image light from the R-panel 42 transmits through the polarization beam splitter 31B to enter the dichroic prism 37. B-S polarized light 113S that is B-image light from the B-panel 43 is reflected on the polarization beam splitter 31B to enter the dichroic prism 37.

The R-P polarized light 112P and the B-S polarized light 113S entered the dichroic prism 37 are reflected on the dichroic prism 37 to be projected on the plane to be projected by the projection lens 5.

Thus, the projector of the present embodiment is constituted by using two array light sources 10A and 10B, two polarization conversion elements 11 and 12, and three liquid crystal panels 41 to 43. When G-light (one colored light) among three colored lights enters the G-panel 41, at the same time, The G-, R-, and B-LEDs 111 to 113 are turned on so that the R-light and the B-light (two colored lights) enter the R- and B-panels 42 and 43, respectively. Thus, a projected image as an RGB color image is displayed on a plane to be projected.

In embodiment 1 described above, since only two liquid panels are used, it is necessary to turn on the R-LED and the B-LED alternately and to control the RB-panel in synchronization with it. On the other hand, in the present embodiment, because all of the R-, G-, and B-LEDs can be turned on at the same time, the projected image can be brighter. In addition, a color break is not generated.

The light guide optical system (color separating and combining optical system) constituted by the reflection mirror 36, the dichroic prism 37, and the polarization beam splitters 31A and 31B, shown in FIG. 11, is simply one example, and a light guide optical system that has another configuration may also be used.

Embodiment 4

Figure 14A:
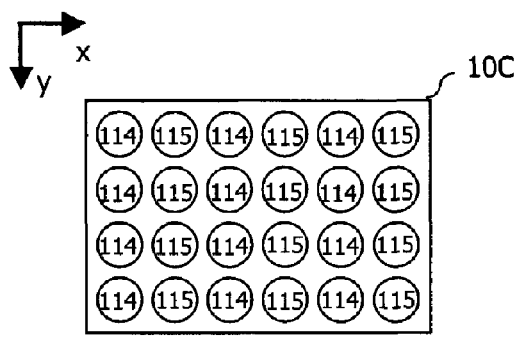
FIGS. 14A and 14B are views showing an arrangement of LEDs in two array light sources in embodiment 4.
Figure 14B:
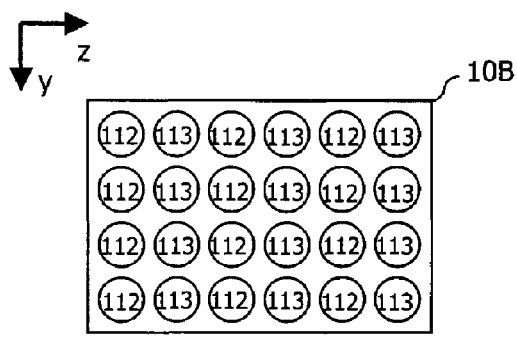
Figure 15:
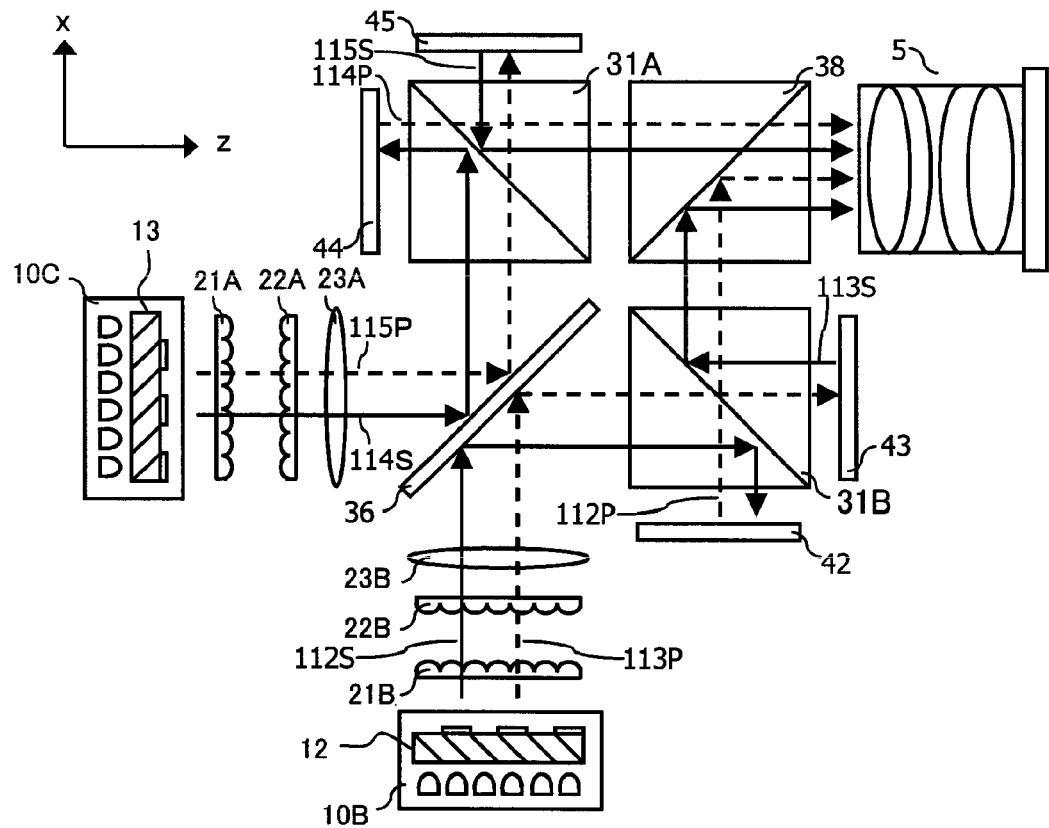
FIG. 15 is a view showing a configuration of a liquid crystal projector of embodiment 4.

FIGS. 13 to 15 show configurations of a liquid crystal projector that is embodiment 4 of the present invention. In these drawings, an xyz-coordinate system is set in the three-dimensional space, and it is defined that lights from LED array light sources (hereinafter, referred to simply as array light sources) 10C and 10B are propagated in an illumination optical system described later in a z-direction and an x-direction, respectively.

Figure 13A:
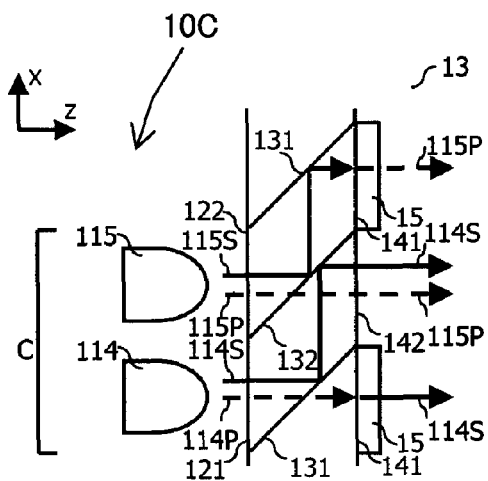
FIGS. 13A and 13B are views showing a configuration of a part of two array light sources and two polarization conversion elements which are used for a liquid crystal projector that is embodiment 4 of the present invention.
Figure 13B:
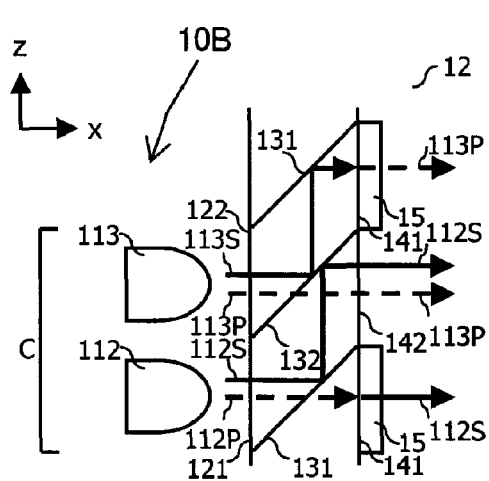

FIGS. 13A and 13B show xz cross sections of parts of the array light sources 10C and 10B and the polarization conversion elements 133 and 12 in the liquid crystal projector. FIGS.

14A and 14B show arrangements of a plurality of LEDs when the array light sources 10C and 10B are seen from a side opposite to the z-direction and the x-direction, respectively. Further, FIG. 15 shows an xz cross section of an overall configuration of the liquid crystal projector.

In FIGS. 13 and 14, reference numeral 114 denotes a G1-LED which emits light of a short wavelength side in a green (G) band (first colored light: hereinafter, referred to as G1-light) that is a first wavelength band. Reference numeral 115 denotes a G2-LED which emits light of a long wavelength side in the G band (fourth colored light: hereinafter, referred to as G2-light). Reference numeral 112 denotes an R-LED which emits light having a red (R) band (second colored light: hereinafter, referred to as an R-light) that is a second wavelength band different from the first wavelength band. Reference numeral 113 denotes a B-LED which emits light having a blue (B) band (third colored light: hereinafter, referred to as a B-light) that is a third wavelength band different from the first and second wavelength bands.

The G2-light is light that has a color close to that of the G1-light compared with the R-light and the B-light. In other words, the G2-light is colored light that has a color similar to that of the G1-light.

Thus, the projector of the present embodiment includes a plurality of light sources (LEDs) which emit corresponding one of the four colored lights different in wavelength bands from one another. Each LED emits non-polarized light.

As shown in FIG. 14A, the array light source 10C includes a G1-LED array where a plurality of G1-LEDs 114 are arranged in a second direction (y-direction) orthogonal to a first direction (x-direction) and a G2-LED array where a plurality of G2-LEDs 115 are arranged in the same direction. These G1-LED array and G2-LED array are alternately arranged adjacent to each other in the x-direction.

As shown in FIG. 14B, the array light source 10B includes an R-LED array where a plurality of R-LEDs 112 are arranged in the second direction (y-direction) orthogonal to the first direction (z-direction) and a B-LED array where a plurality of B-LEDs 113 are arranged in the same direction. These R-LED array and B-LED array are alternately arranged adjacent to each other in the z-direction.

In FIG. 13A, a polarization conversion element 13 has a plurality of polarization conversion cells C which are arrayed in an x-direction. A y-direction is a longitudinal direction of each polarization conversion cell C. An arrangement period of the G1-LED arrays and the G2-LED arrays of the array light source 10C in the x-direction is twice as large as that of the polarization conversion cells C in the same direction. Each polarization conversion cell C includes two first polarization splitting films (polarization splitting planes) 131, one second polarization splitting film (polarization splitting plane) 132 arranged between them, and one phase plate 15. An arrangement direction of the plurality of polarization conversion cells C, i.e. an arrangement direction (x-direction) of the plurality of first and second polarization splitting films 131 and 132 corresponds to an alternate arrangement direction of the G1-LED arrays and the G2-LED arrays.

In FIG. 13B, a polarization conversion element 12 has a plurality of polarization conversion cells C which are arrayed in a z-direction. A y-direction is a longitudinal direction of each polarization conversion cell C. An arrangement period of the R-LED arrays and the B-LED arrays of the array light source 10B in the z-direction is twice as large as that of the polarization conversion cells C in the same direction. Each polarization conversion cell C includes two first polarization splitting films (polarization splitting planes) 131, one second polarization splitting film (polarization splitting plane) 132 arranged between them, and one phase plate 15. An arrangement direction of the plurality of polarization conversion cells C, i.e. an arrangement direction (z-direction) of the plurality of first and second polarization splitting films 131 and 132 corresponds to the alternate arrangement direction of the R-LED arrays and the B-LED arrays.

In both polarization conversion elements 13 and 12, a region from a position of the first polarization splitting film 131 up to a position of the second polarization splitting film 132 at the upper side in an incident plane of each polarization conversion cell C is referred to as a first incident opening 121. In the polarization conversion element 12, a region from the second polarization splitting film 132 up to the first polarization splitting film 131 at the upper side in the incident plane of each polarization conversion cell C is referred to as a second incident opening 122.

In both polarization conversion elements 13 and 12, a region from a position of the first polarization splitting film 131 up to a position of the second polarization splitting film 132 at the bottom side in an emission plane of each polarization conversion cell C is referred to as a first emission opening 141. In the polarization conversion element 12, a region from a position of the second polarization splitting film 132 up to a position of the first polarization splitting film 131 at the upper side in the emission plane of each polarization conversion cell C is referred to as a second emission opening 142.

Each of the first polarization splitting film 131 and the second polarization splitting film 132 has a tilt of 45 degrees with respect to an incident optical axis direction of light (z-direction for the polarization conversion element 13, and x-direction for the polarization conversion element 12) Each polarization splitting film has characteristics of a transmittance for P-polarized light that is equal to or close to 100% (higher than 50%) and a transmittance for S-polarized light that is equal to or close to 0% (lower than 50%). Each polarization splitting film is actually formed on a surface of a substrate made of glass or acrylic that is a parallel plate as a multi-layer film. The first and the second polarization splitting films 131 and 132 split each of the G-light, the R-light, and the-B light that are three colored lights into two polarized lights which have polarization directions different from each other (P-polarized light and S-polarized light).

The phase plate 15 formed like a film shape is provided at the first emission opening 141 in an emission plane of each polarization conversion cell C. The phase plate 15 is a ½ wavelength plate, and has a function that changes (rotates by 90 degrees) a polarization direction of an incident linearly polarized light.

An optical action of the polarization conversion element 13 will be described. P-polarized light 114P and S-polarized light 114S contained in G1-light emitted as non-polarized light from the G1-LED 114 of the array light source 10C enter each polarization conversion cell C from the first incident opening 121.

P-polarized light 115P and S-polarized light 115S contained in G2-light emitted as non-polarized light from the G2-LED 115 of the array light source 10C enter each polarization conversion cell C from the second incident opening 122.

An optical member (not shown) which converts a divergent light beam emitted from each G1-LED and G2-LED into a parallel light beam or a convergent light beam which converges on each polarization splitting film is preferably provided between the array light source 10C and the polarization conversion element 13.

The P-polarized light 114P in the G1 lights entered each polarization conversion cell C from the first incident opening 121 transmits through the first polarization splitting film 131 and is converted into the S-polarized light 114S by the phase plate 15 provided at the first emission opening 141 to be emitted. The S-polarized light 114S in the G1 lights entered each polarization conversion cell C from the first incident opening 121 is reflected on the first polarization splitting film 131 and is further reflected on the second polarization splitting film 132 to be emitted as S-polarized light 114S from the second emission opening 142. Thus, all of the G1 lights emitted from the GLEDs 114 are converted into S-polarized lights (hereinafter, referred to as G1-S polarized lights) to be emitted from the polarization conversion element 13.

The P-polarized light 115P in the G2-lights entered each polarization conversion cell C from the second incident opening 122 transmits through the second polarization splitting film 132 and is emitted remaining as P-polarized light 115P from the second emission opening 142. The S-polarized light 115S in the G2-lights entered each polarization conversion cell C from the second incident opening 122 is reflected on the second polarization splitting film 132 and is further reflected on the first polarization splitting film 131 to be converted into the P-polarized light 115P by the phase plate 15 provided at the first emission opening 141 to be emitted. Thus, all of the G2-lights emitted from the G2-LEDs 115 are converted into P-polarized lights (hereinafter, referred to as G2-P polarized lights) to be emitted from the polarization conversion element 13.

An optical action for the P-polarized lights 112P and 113P and the S-polarized lights 112S and 113S contained in the R-lights and the B-lights emitted as non-polarized lights from the R-LEDs 112 and the B-LEDs 113 in the array light source 10B of the polarization conversion element 12 is the same as that of the polarization conversion element 12 of embodiment 3. All R-lights are emitted as S-polarized lights (R-S polarized lights) and all B-lights are emitted as P-polarized lights (B-P polarized lights) from the polarization conversion element 12.

Thus, in the present embodiment, the G1-light and the G2-light which have polarization directions different from each other and the R-light and the B-light which have polarization directions different from each other are emitted from the polarization conversion elements 13 and 12.

In FIG. 15, as described above, each of the G1-S polarized light 114S, the G2-P polarized light 115P, the R-S polarized light 112S, and the B-P polarized light 113P is emitted as a light beam from one of the polarization conversion elements 13 and 12. Each light beam is split into a plurality of light beams by a first fly-eye lens 21A or 21B, and each split light beam is condensed near a second fly-eye lens 22A or 22B to form a light source image (two-dimensional light beam image). Each of the first and second fly-eye lenses 21A, 21B, 22A, and 22B is constituted by a plurality of lens cells arranged in two-dimensional directions. Each lens cell has a rectangular lens shape that is a shape similar to the G1-, G2-, R-, or B-panel (light modulation element or image forming element) that is a reflective liquid crystal panel described later or a plane to be projected.

A plurality of split light beams as G1-S polarized light 114S transmitted through the second fly-eye lens 22A are condensed by a condenser lens 23A. Subsequently, it is reflected on a reflection mirror 36 and a polarization beam splitter 31A which has the same characteristics as those of the polarization beam splitter 31 of embodiment 1 to be superimposed on the G-panel 41. Thus, the G1-panel (first light modulation element) 44 is uniformly illuminated by the G1-S polarized light 114S.

A plurality of split light beams as G2-P polarized light 115P transmitted through the second fly-eye lens 22A are condensed by the condenser lens 23A to be reflected on the reflection mirror 36 to transmit through the polarization beam splitter 31A to be superimposed on a G2-panel 45. Thus, the G2-panel (fourth light modulation element) 45 is uniformly illuminated by the G2-P polarized light 115P.

Each of a plurality of split light beams as R-S polarized light 112S and B-P polarized light 113P transmitted through the second fly-eye lens 22B is condensed by a condenser lens 23B. Subsequently, it is reflected on the reflection mirror 36, and is reflected on or transmits through a polarization beam splitter 31B which has the same characteristics as those of the polarization beam splitter 31 of embodiment 1 to be superimposed on the R-panel 42 and the B-panel 43. Thus, the R-panel (second light modulation element) 42 and the B-panel (third light modulation element) 43 are uniformly illuminated by the R-S polarized light 112S and the B-P polarized light 113P, respectively.

The G1-P polarized light 114P that is G1-image light from the G1-panel 44 transmits through the polarization beam splitter 31A to enter a dichroic prism 38.

Figure 16:
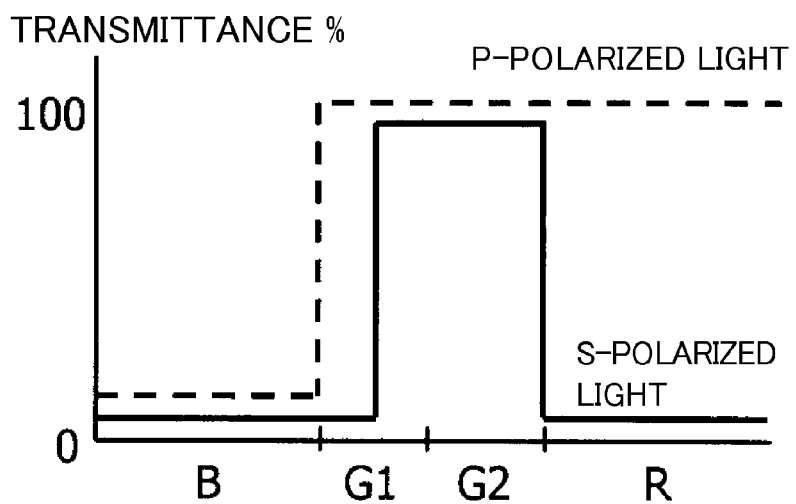
FIG. 16 is a view showing optical characteristics of a dichroic prism in embodiment 4.

The dichroic prism 38 has a polarization splitting film inside it and has a tilt of 45 degrees with respect to an incident optical axis direction (z-direction and x-direction). The polarization splitting film of the dichroic prism 38, as shown in FIG. 16, has characteristics of transmittance for P-polarized light that is equal to or close to 0% (lower than 50%) in the B-band and that is equal to or close to 100% (higher than 50%) in the G1-, G2-, and R-bands. The polarization splitting film has characteristics of transmittance for S-polarized light that is equal to or close to 0% (lower than 50%) in the B- and R-bands and that is equal to or close to 100% (higher than 50%) in the G1- and G2-bands. This polarization splitting film is formed as a multi-layer film inside the prism.

The G1-P polarized light 114P entered the dichroic prism 38 transmits through the dichroic prism 38 to be projected on a plane to be projected such as a screen (not shown) by the projection lens 5.

G2-S polarized light 115S that is G2-image light from the G2-panel 45 is reflected on the polarization beam splitter 31A to enter the dichroic prism 38. G2-S polarized light 115S entered the dichroic prism 38 transmits through the dichroic prism 38 to be projected on a plane to be projected by the projection lens 5.

R-P polarized light 112P that is R-image light from the R-panel 42 transmits through the polarization beam splitter 31B to enter the dichroic prism 38. B-S polarized light 113S that is B-image light from the B-panel 43 is reflected on the polarization beam splitter 31B to enter the dichroic prism 38.

The R-P polarized light 112P and the B-S polarized light 113S entered the dichroic prism 38 are reflected on the dichroic prism 38 to be projected on the plane to be projected by the projection lens 5.

Thus, the projector of the present embodiment is constituted by using two array light sources 10C and 10B, two polarization conversion elements 13 and 12, and four liquid crystal panels 44, 42, 43 and 45. The G1-LED 114, the R-LED 112, the B-LED 113, and the G2-LED 115 are turned on so that the G1-light, the R-light, the B-light, and the G2-light that are four colored lights enter the G1-panel 44, the R-panel 42, the B-panel 43, and the G2-panel 45, respectively, at the same time. Thus, a projected image as an RGB color image is displayed on the plane to be projected.

In embodiment 1 described above, it is necessary to alternately turn on the R-LED and the B-LED to control the RB-panel in synchronization with it. On the other hand, in the present embodiment, because all of R-, G1-, G2-, and B-LEDs can be turned on at the same time, the projected image can be brighter. In addition, a color break is not generated. Furthermore, because four colored lights are used, a color reproduction area of the projected image can be widened.

The plurality of LEDs may be turned on so that at least one colored light of the G1-light and the G2-light and at least one of the R-light and the B-light enter at least two light modulation elements at the same time.

In the above embodiments, the case where the G-light is split into the G1-light and the G2-light and respective LEDs are independently controlled has been described, but the R-light or the B-light may also be split. Further, in the above embodiments, the four colored lights (LEDs 112 to 115) may be replaced with one another.

Furthermore, the light guide optical system (color separating and combining optical system), shown in FIG. 15, constituted by the reflection mirror 36, the dichroic prism 38, and the polarization beam splitters 31A and 31B is simply an example, but a light guide optical system that has another configuration may also be used.

Furthermore, in each of the above embodiments, the case where the reflective liquid crystal panel is used as a light modulation element has been described, but the present invention may also use another light modulation element such as a transmissive liquid crystal panel or a DMD (Digital Micromirror Device).

According to each of the above embodiments, because at least two colored lights enter at least two light modulation elements from a polarization conversion element at the same time so that an image corresponding to the two colored lights is projected, the reduction of the brightness of the projected image can be suppressed and the generation of the color break can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-216447, filed on Aug. 26, 2008, which is hereby incorporated by reference herein in its entirety.

What is claimed is:

1. An image projection apparatus that causes a first colored light to enter a first reflective liquid crystal display element and causes second and third colored lights to enter a second reflective liquid crystal display element alternately, and projects a color image, said image projection apparatus comprising:
   the first reflective liquid crystal display element;
   the second reflective liquid crystal display element;
   a first light source configured to emit the first colored light;
   a second light source configured to emit the second colored light;
   a third light source configured to emit the third colored light;
   a drive unit configured to control lighting of the first, second and the third light sources;
   a polarization conversion element configured to control a polarization direction of a colored light emitted from at least one of the first, second and third light sources that are lighted by the drive unit;
   a polarization beam splitter configured to guide the colored light from the polarization conversion element to the first and second reflective liquid crystal display elements in accordance with the polarization direction; and
   a projection optical system configured to project light from the first and second reflective liquid crystal display elements onto a plane to be projected,
   wherein the first, second and third colored lights have different wavelengths from each other,
   wherein the first colored light and the second or third colored light are emitted from the polarization conversion element as lights whose polarization directions are different from each other,
   wherein the drive unit controls the lighting of the second and third light sources so that the second colored light and the third colored light alternately enters the second reflective liquid crystal display element, and
   wherein the drive unit controls the lighting of the first light source so that the first colored light enters the first reflective liquid crystal display element both when the drive unit causes the second light source to be lighted and when the drive unit causes the third light source to be lighted.

2. An image projection apparatus according to claim 1,
   wherein the polarization conversion element includes a plurality of polarization splitting surfaces configured to split incident light into two polarized lights whose polarization directions are different from each other and a phase plate configured to change a polarization direction of one of the two polarized lights that are split by the polarization splitting plane, and
   wherein in a first direction where the plurality of polarization splitting planes of the polarization conversion element are arrayed, an array including a plurality of the first light sources arranged in a second direction orthogonal to the first direction and an array including a plurality of the second and third light sources, each of which is arranged in the second direction, are disposed adjacent to each other.

3. An image display system comprising:
   an image projection apparatus configured to cause a first colored light to enter a first reflective liquid crystal display element and to cause second and third colored lights to enter a second reflective liquid crystal display element alternately, and to project a color image; and
   an image supply apparatus configured to supply image information to the image projection apparatus,
   wherein the image projection apparatus includes:
   the first reflective liquid crystal display element;
   the second reflective liquid crystal display element;
   a first light source configured to emit the first colored light;
   a second light source configured to emit the second colored light;
   a third light source configured to emit the third colored light;
   a drive unit configured to control lighting of the first, second, and the third light sources;
   a polarization conversion element configured to control a polarization direction of a colored light emitted from at least one of the first, second and third light sources that are lighted by the drive unit;
   a polarization beam splitter configured to guide the colored light from the polarization conversion element to the first and second reflective liquid crystal display elements in accordance with the polarization direction; and
   a projection optical system configured to project light from the first and second reflective liquid crystal display elements onto a plane to be projected, wherein the first, second and third colored lights have different wavelengths from each other, wherein the first colored light and the second or third colored light are emitted from the polarization conversion element as lights whose polarization directions are different from each other, wherein the drive unit controls the lighting of the second and third light sources so that the second colored light and the third colored light alternatively enters the second reflective liquid crystal display element, and wherein the drive unit controls the lighting of the first light source so that the first colored light enters the first reflective liquid crystal display element both when the drive unit causes the second light source to be lighted and when the drive unit causes the third light source to be lighted.

4. An image projection apparatus according to claim 1, wherein the first colored light has a green wavelength range.

5. An image projection apparatus according to claim 3, wherein the first colored light has a green wavelength range.

* * * * *